US012345262B2

(12) United States Patent
Luyckx et al.

(10) Patent No.: US 12,345,262 B2
(45) Date of Patent: Jul. 1, 2025

(54) NON-LUBRICATED COMPRESSOR WITH ABRADABLE SEALING ELEMENT AND RELATED METHOD FOR ASSEMBLING IT

(71) Applicant: ATLAS COPCO AIRPOWER, NAAMLOZE VENNOOTSCHAP, Wilrijk (BE)

(72) Inventors: Pierre-Yves Luyckx, Wilrijk (BE); Bartel Buls, Wilrijk (BE); Karen Marien, Wilrijk (BE)

(73) Assignee: ATLAS COPCO AIRPOWER, NAAMLOZE VENNOOTSCHAP, Wilrijk (BE)

( * ) Notice: Subject to any disclaimer, the term of this patent is extended or adjusted under 35 U.S.C. 154(b) by 0 days.

(21) Appl. No.: 18/698,478

(22) PCT Filed: Oct. 5, 2022

(86) PCT No.: PCT/IB2022/059489
§ 371 (c)(1),
(2) Date: Apr. 4, 2024

(87) PCT Pub. No.: WO2023/062479
PCT Pub. Date: Apr. 20, 2023

(65) Prior Publication Data

US 2024/0426300 A1 Dec. 26, 2024

(30) Foreign Application Priority Data

Oct. 15, 2021 (EP) .................................... 21202975

(51) Int. Cl.
*F04C 27/00* (2006.01)
*F04C 18/22* (2006.01)

(52) U.S. Cl.
CPC .............. *F04C 27/00* (2013.01); *F04C 18/22* (2013.01); *F04C 27/002* (2013.01);
(Continued)

(58) Field of Classification Search
CPC ........ F04C 27/00; F04C 18/22; F04C 27/002; F04C 2230/10; F04C 2230/60;
(Continued)

(56) References Cited

U.S. PATENT DOCUMENTS 2,925,786 A 2/1960 Hill
3,949,711 A 4/1976 Shobert, II
(Continued)

FOREIGN PATENT DOCUMENTS

EP 0 866 224 A1 9/1998
JP 51-70306 U 6/1976
WO WO-2020157568 A1 * 8/2020 ................ F01C 1/12

OTHER PUBLICATIONS

Google translation of Japanese Publication JP 51-70306 U, Inventor: Yasuyuki, Title: Rotary Piston Engine Casing, Published: Jun. 3, 1976. (Year: 1976).*
(Continued)

*Primary Examiner* — Mary A Davis
(74) *Attorney, Agent, or Firm* — Sughrue Mion, PLLC

(57) ABSTRACT

The non-lubricated compressor (10) for compressing a gas, comprises: a stationary stator (12) with a housing (18) comprising a rotor cavity (20) delimited by a bottom wall (22), a top wall (24), and a lateral wall (26) connecting said bottom wall (22) and said top wall (24), a rotor element (14) arranged for rotation about an axis (z) within the rotor cavity (20) for compressing a gas therein, a self-supporting sealing element (16) arranged within the rotor cavity (20), wherein the sealing element (16) is made of an abradable carbon material, and comprises a wall portion (34) arranged on an inner surface of the lateral wall (26) of the rotor cavity (20).

17 Claims, 3 Drawing Sheets

(52) U.S. Cl.
CPC ...... *F04C 2230/10* (2013.01); *F04C 2230/60* (2013.01); *F04C 2240/10* (2013.01); *F04C 2240/30* (2013.01); *F04C 2240/801* (2013.01); *F04C 2240/802* (2013.01); *F05C 2251/10* (2013.01)

(58) Field of Classification Search
CPC .............. F04C 2240/10; F04C 2240/30; F04C 2240/801; F04C 2240/802; F05C 2251/10
See application file for complete search history.

(56) References Cited

U.S. PATENT DOCUMENTS

| | | | | |
|---|---|---|---|---|
| 5,554,020 | A * | 9/1996 | Rao | F01C 21/104<br>428/416 |
| 7,726,286 | B2 * | 6/2010 | Prior, II | F04C 18/086<br>418/179 |
| 9,534,119 | B2 * | 1/2017 | Suman | C09D 5/033 |
| 10,539,036 | B2 * | 1/2020 | Amini | C08K 3/04 |
| 2007/0065330 | A1 * | 3/2007 | Wallack | C22C 38/44<br>420/95 |

OTHER PUBLICATIONS

International Search Report for PCT/IB2022/059489 dated Dec. 15, 2022.
Written Opinion for PCT/IB2022/059489 dated Dec. 15, 2022.

* cited by examiner

NON-LUBRICATED COMPRESSOR WITH ABRADABLE SEALING ELEMENT AND RELATED METHOD FOR ASSEMBLING IT

CROSS REFERENCE TO RELATED APPLICATIONS

This application is a National Stage of International Application No. PCT/IB2022/059489 filed Oct. 5, 2022, claiming priority based on European Patent Application No. 21202975.5 filed Oct. 15, 2021.

BACKGROUND OF THE INVENTION

Field

The present invention relates to a non-lubricated compressor for compressing a gas, comprising a rotor cavity, a rotor element arranged within the rotor cavity and a sealing element made of abradable carbon material arranged within the rotor cavity.

Background

Non-lubricated compressors make no use of liquid lubricant to create a seal between the rotor and the housing. Generally, in known non-lubricated compressors, an abradable layer of coating is applied to the functional surfaces, i.e. to the surface of the rotor and/or to the inner side of the walls delimiting the rotor cavity; the layer of coating tends to wear off partially during a run-in period of the compressor to create as tight a seal as possible.

A disadvantage of these known embodiments is that the application of the abradable coating takes a relatively long time, since it requires the laying of a plurality of layers of coating, and makes the process relatively expensive. Furthermore, the coating provides a limited amount of margin to tolerate machining tolerances, and thus the parts need to be produced with strict tolerance limits.

An abradable sealing element is shown, for example, by international patent application WO 2050/157567 A1 in the name of the Applicant. The patent publication discloses a non-lubricated system comprising a stationary stator and a rotatable rotor element where an abradable coating is provided on at least one side facing the rotor element of a sealing element incorporated in a rotor cavity. Nevertheless, the sealing element shown by this publication only covers top and bottom walls of the rotor cavity, and not the lateral ones, and does not provide a sufficiently tight sealing. Furthermore, a sealing is not readily applicable to a Wankel-type machine and in particular to a Wankel compressor.

A three-dimensional sealing element, or liner, made of a non-abradable metallic material for application to a Wankel-type machine, in particular to a Wankel engine, is shown by US patent application no. U.S. Pat. No. 4,021,163 A.

The object of this invention is to provide a non-lubricated compressor which does not suffer from the drawbacks of the prior art, and in particular a non-lubricated compressor which is easy and cheap to manufacture, while at the same time is provided with a sufficiently tight sealing element.

SUMMARY OF THE INVENTION

This and other objects are fully achieved according to this invention by a non-lubricated compressor and by a related method for assembling such a non-lubricated compressor.

Advantageous embodiments of the invention are specified in the dependent claims, the content of which is to be understood as an integral part of the following description.

In summary, a first aspect of the invention is based on the idea of providing a non-lubricated compressor for compressing a gas, comprising:

- a stationary stator with a housing comprising a rotor cavity delimited by a bottom wall, a top wall, and a lateral wall connecting said bottom wall and said top wall,
- a rotor element arranged for rotation about an axis z, preferably for eccentric motion about said axis z, within the rotor cavity for compressing a gas therein,
- a self-supporting sealing element arranged within the rotor cavity, the compressor being characterized in that the sealing element is made of an abradable carbon material, and in that the sealing element comprises a wall portion arranged on an inner surface of the lateral wall of the rotor cavity.

As used herein, in the description and in the appended claims, the expression "arranged for rotation about an axis" includes both the condition of an element being arranged for simple rotation about an axis, and the condition of an element being arranged for eccentric motion, i.e. a condition wherein the element rotates around an axis that is not positioned at its centre, as it happens in the case of Wankel-type rotary machines.

As used herein, in the description and in the appended claims, "self-supporting" means that the sealing element on its own is strong enough to be handled during assembly of the non-lubricated compressor. Consequently, the sealing element may be manufactured separately and then inserted, or fitted, into the rotor cavity of the housing and, for example, glued, screwed, attached, clamped, locked or otherwise fastened to the rotor cavity.

As used herein, in the description and in the appended claims, "abradable carbon material" refers to a carbon material that wears off in powder form, or to a carbon material that is brittle in its mechanical behaviour, i.e. where microparticles wear off through contact with the relevant end face of the rotating rotor element of the non-lubricated compressor. Ideally, these worn microparticles have a number-average particle size that is smaller than 1 pm.

The abradable carbon material allows for controlled wear during run-in of the system, taking into account the heat generated during run-in, whereby microparticles as defined above wear off. Thus, a quantity of abradable material is removed from the sealing element, e.g. a 50 μm thick layer of abradable material, until sufficient abradable material has been removed to allow proper rotation of the rotor element and the remaining abradable material in the sealing element provides a sufficiently tight seal, i.e. the remaining gap is, for example, smaller than 10 μm.

According to a preferable embodiment of the invention, the sealing element further comprises a plate-like portion, connected with, or integral with, the wall portion of the sealing element, and the plate-like portion is arranged on an inner surface of the bottom wall of the rotor cavity. Preferably, the sealing element also comprises a further plate-like portion arranged on an inner surface of the top wall of the rotor cavity. In this embodiment, the plate-like portion and the wall portion of the sealing element are preferably made in one piece, and, more preferably, the further plate-like portion is provided as a separate cover component.

According to a preferable embodiment of the invention, the wall portion of the sealing element has an inner surface facing inward the rotor cavity and an outer surface on the opposed side, the inner surface having an epitrochoidal shape, or hypotrochoid shape, in a cross-section on a plane parallel to the bottom wall of the rotor cavity. In this embodiment, the outer surface of the wall portion of the sealing element is preferably entirely in contact with the lateral wall of the rotor cavity.

In accordance with preferable embodiments of the invention, the self-supporting sealing element may have a minimum thickness of preferably at least 2 mm, further preferably at least 2.5 mm and further preferably at least 3 mm.

The sealing element may consist, for example, of a single layer of abradable carbon material, but, in an embodiment, it comprises a layered structure made of abradable carbon material layers.

In accordance with preferred embodiments, the sealing element is made at least partially of a carbon matrix, i.e. the abradable carbon material comprises or consists of a carbon matrix. The carbon matrix is at least partly, preferably predominantly, in the form of graphite, e.g. fine-grained graphite. In accordance with embodiments, the degree of graphitization is PI, defined as the probability for adjacent hexagonal carbon layers to have a graphite relationship, greater than 60%, greater than 80% or greater than 95%. X-ray diffraction spectroscopy provides a suitable way to determine the degree of graphitization.

An abradable carbon material in the form of a carbon matrix in accordance with the invention is available through the carbonization (e.g. at high temperature in the presence or absence of oxygen) of a composite, where the composite comprises a polymer matrix and carbon (e.g. in the form of carbon fibres or carbon particles). In embodiments, the polymer is chosen from the group consisting of polyesters, vinyl esters, polyepoxides, polyphenols, polyimides, polyamides, polypropylene, and polyether ether ketone, according to further preference, the polymer is a polyepoxide.

Preferably, an abradable carbon material in the form of a carbon matrix in accordance with the invention is available by also subjecting the carbonized composite as described above to a separate graphite-forming step, which increases the degree of graphitization, such as high temperature treatment. In embodiments, an abradable carbon material in the form of a carbon matrix in accordance with the invention is obtained by impregnating the carbonized composite, which is optionally subjected to a separate graphite-forming step. Impregnation can take place with metals, salts or polymers.

In preferred embodiments, the abradable carbon material comprises more than 80%, 90% or 95% carbon by weight.

In accordance with a preferred embodiment, the preferred C2 Shore hardness of the abradable carbon material of the sealing element is between 60 and 70, and most preferably it is about 65. As used here and known to any person skilled in the art, "C2 Shore hardness" refers to the Shore Hardness as defined by the ASTM D2240 standard.

In accordance with an embodiment of the invention, the rotor element may be made of stainless steel, preferably of hardened stainless steel.

In accordance with a most preferred embodiment of the invention, the rotor cavity is a Wankel-type compression chamber and the rotor element is a Wankel-type rotor, arranged for eccentric motion about a central axis that is substantially orthogonal to the bottom wall of the rotor cavity.

In accordance with an embodiment of the invention, at least part of the surface of the rotor element has a contact surface with a roughness Ra>1.0 μm, preferably Ra>2.5 μm. This can be achieved, for example, by roughening the end face using means known to the person skilled in the art.

In accordance with preferable embodiments of the invention, the sealing element may be provided with one or more opening for the supply and/or exhaust of gas to and/or from the rotor cavity. In other words, these openings form a passage to/from an inlet/outlet port of the housing. In particular, at least one inlet opening and at least one outlet opening may be provided on the lateral and/or bottom wall of the sealing element, for, respectively, the supply of gas to be compressed and the exhaust of compressed gas.

Furthermore, a second aspect of the invention concerns a method for assembling a non-lubricated compressor according to first aspect of the invention, wherein the method comprises the steps of:

a) manufacturing a semi-finished sealing element by machining a block of abradable carbon material so that an outer shape of said block copies an inner shape of said rotor cavity, and so that the block has an open, inner cavity delimited by a bottom wall and by a lateral wall that has a constant thickness;
b) heating the housing of the stator to a temperature of at least 350° C.;
c) fitting the semi-finished sealing element inside the rotor cavity of the housing as long as the housing is at a temperature of at least 350° C.;
d) mounting the rotor element inside the inner cavity of the semi-finished sealing element;
e) running the rotor element so that the inner cavity of the semi-finished sealing element is further machined by the rotor element.

The running of step e) may be done for a duration of a predetermined period of time, for example 5 to 15 minutes.

In accordance with an embodiment of the invention, the method may further comprise a step of roughening at least one end face of the rotor element.

In accordance with embodiments of the invention, step c) can comprise the application of a sealant and/or adhesive and/or a glue and/or a thermal paste between the sealing element and the respective inner surface of the lateral walls of the housing, in order to ensure or facilitate a sufficiently tight sealing between the sealing element and the inner surface of the wall of the rotor cavity of the housing and/or to bond the sealing element to the housing.

According to a most preferred embodiment of the method, the rotor element is a Wankel-type rotor arranged for eccentric motion about a central axis that is substantially orthogonal to said bottom wall of the rotor cavity, and, even more preferably, said step e) is performed in such a way as to obtain an inner surface of the sealing element that has an epitrochoidal or hypotrochoid shape in a cross-section parallel to the bottom wall of the rotor cavity.

According to an embodiment of the method, the method further comprises the step of:

f) after step c) or after step a), and before step d), machining the bottom wall of the semi-finished sealing element until it has a constant thickness.

According to an embodiment of the method, the method further comprises the steps of:

g1) after step c), machining, by means of a single drilling step, at least one inlet opening through the lateral wall of the sealing element and through the lateral wall of the rotor cavity for the supply of gas to be compressed; and
g2) after step c), machining, by means of a single drilling step, at least one outlet opening through the lateral wall of the sealing element and through the lateral wall of the rotor cavity for the exhaust of the compressed gas.

According to an embodiment of the method, step c) may further comprise applying an adhesive layer between the semi-finished sealing element and the rotor cavity.

BRIEF DESCRIPTION OF THE DRAWINGS

Further features and advantages of this invention will be clarified by the detailed description that follows, given purely by way of non-limiting example in reference to the accompanying drawings, wherein.

DETAILED DESCRIPTION

Figure 1:
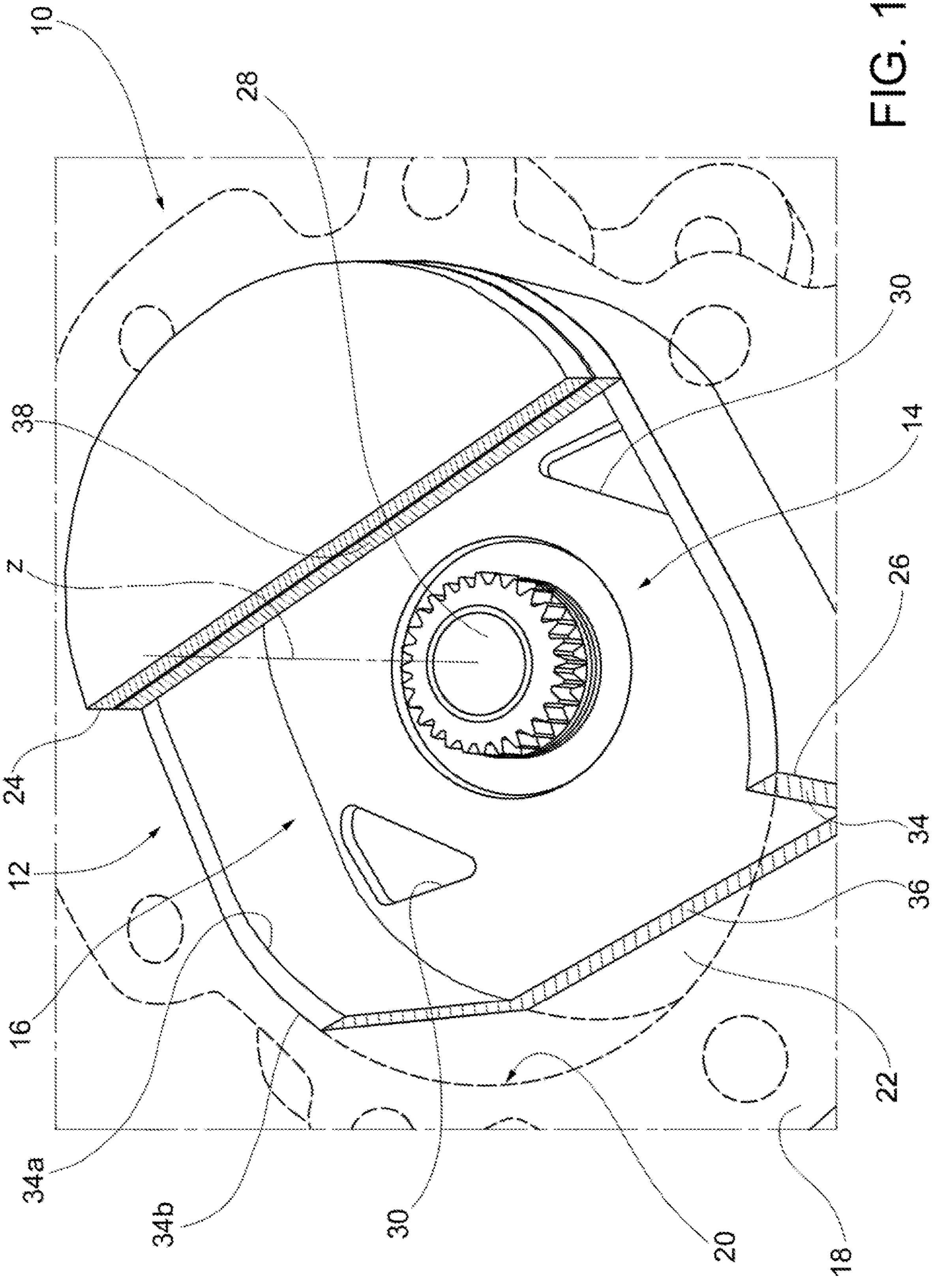
FIG. 1 is a perspective view in partial section of a non-lubricated compressor according to an embodiment of the invention.
Figure 2:
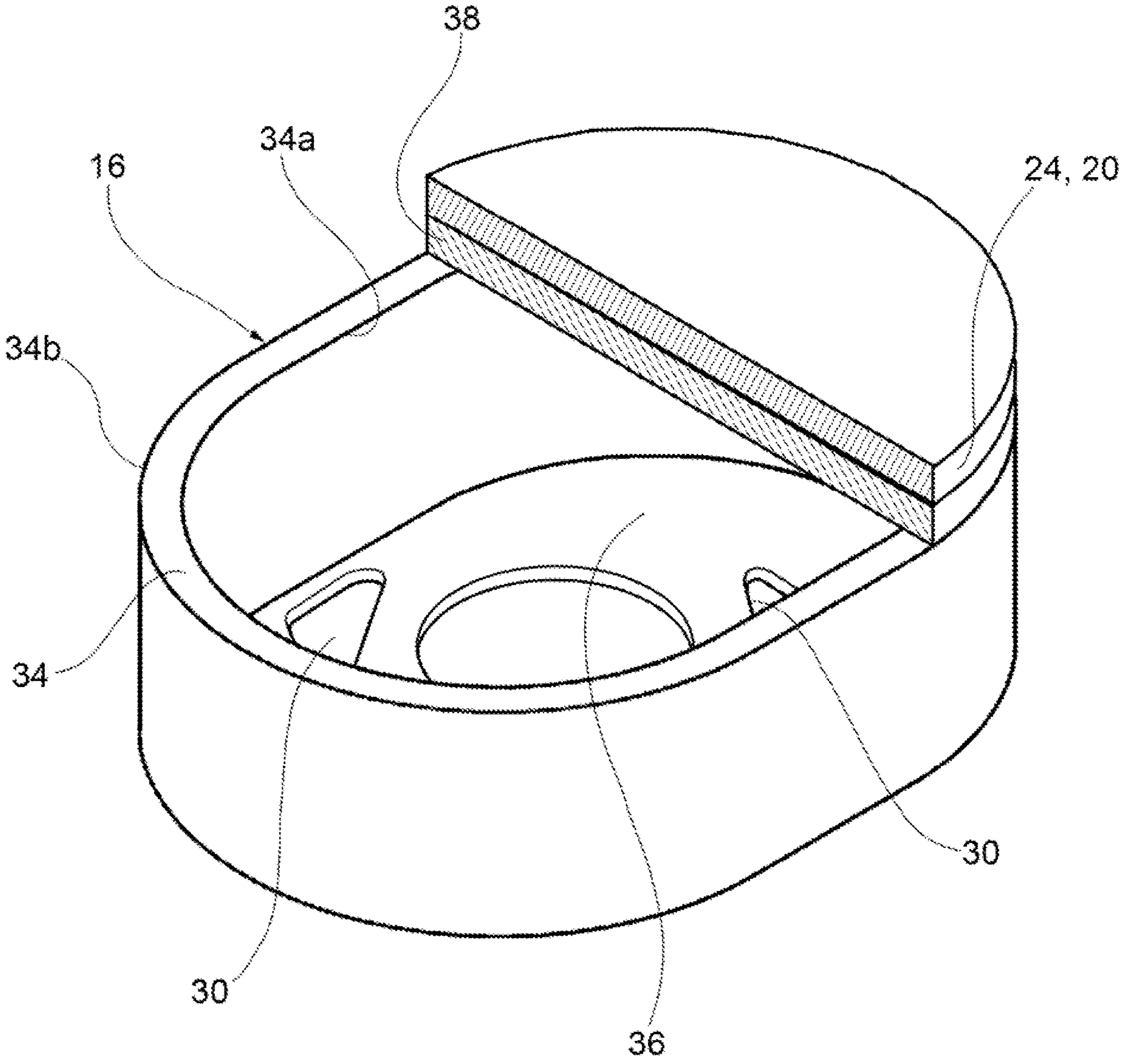
FIG. 2 is a perspective view in partial section of a sealing element of the non-lubricated compressor of FIG. 1.

The present invention will be hereby described with regard to several preferable embodiments and with reference to the drawings, but the invention is not, in any way, limited thereto and is defined solely by the claims. The drawings are to be intended as schematic only and non-restrictive. In the drawings, the size of certain elements may be not drawn to scale, purely for illustrative purposes. The dimensions and relative dimensions do not necessarily correspond to actual practical embodiments of the invention.

With reference to the figures, a non-lubricated compressor according to the invention is indicated with reference number 10.

The compressor 10 as shown in the figures is a non-lubricated system, for compressing a gas or gas mixture such as air, for example. Non-lubricated means that no liquid is injected into the gas stream for lubrication, cooling or sealing. The sealing of the rotor element relative to the rotor cavity of the housing is done as hereby described, but the compressor 10 may also comprise additional provisions for sealing, for example, sealing in relation to the environment. Such additional provisions are known to the person skilled in the art and are therefore not further described here.

The compressor 10 according to the invention essentially comprises a stationary stator 12, a rotor element 14 and a sealing element 16.

In a manner known per se, the stationary stator 12 has a housing 18 that comprises a rotor cavity 20.

The rotor cavity 20 is delimited by a bottom wall 22, a top wall 24, and a lateral wall 26 that connects the bottom wall 22 to the top wall 24. The bottom wall 22 has an essentially flat surface facing inward the rotor cavity 20. In a preferable embodiment, the top wall 24 also has an essentially flat surface facing toward the rotor cavity 20, and more preferably, the top wall 24 is parallel to the bottom wall 22. As shown in the figures, in a preferable embodiment the lateral wall 26 is orthogonal to both the bottom wall 22 and the top wall 24. The lateral wall 26 may be of any shape, although in a preferable embodiment it has a stadium shape, or a discorectangular shape, or an obround shape, i.e. it comprises two flat wall portions, facing each other, joined by a pair of opposed semi-circular walls.

Figure 3:
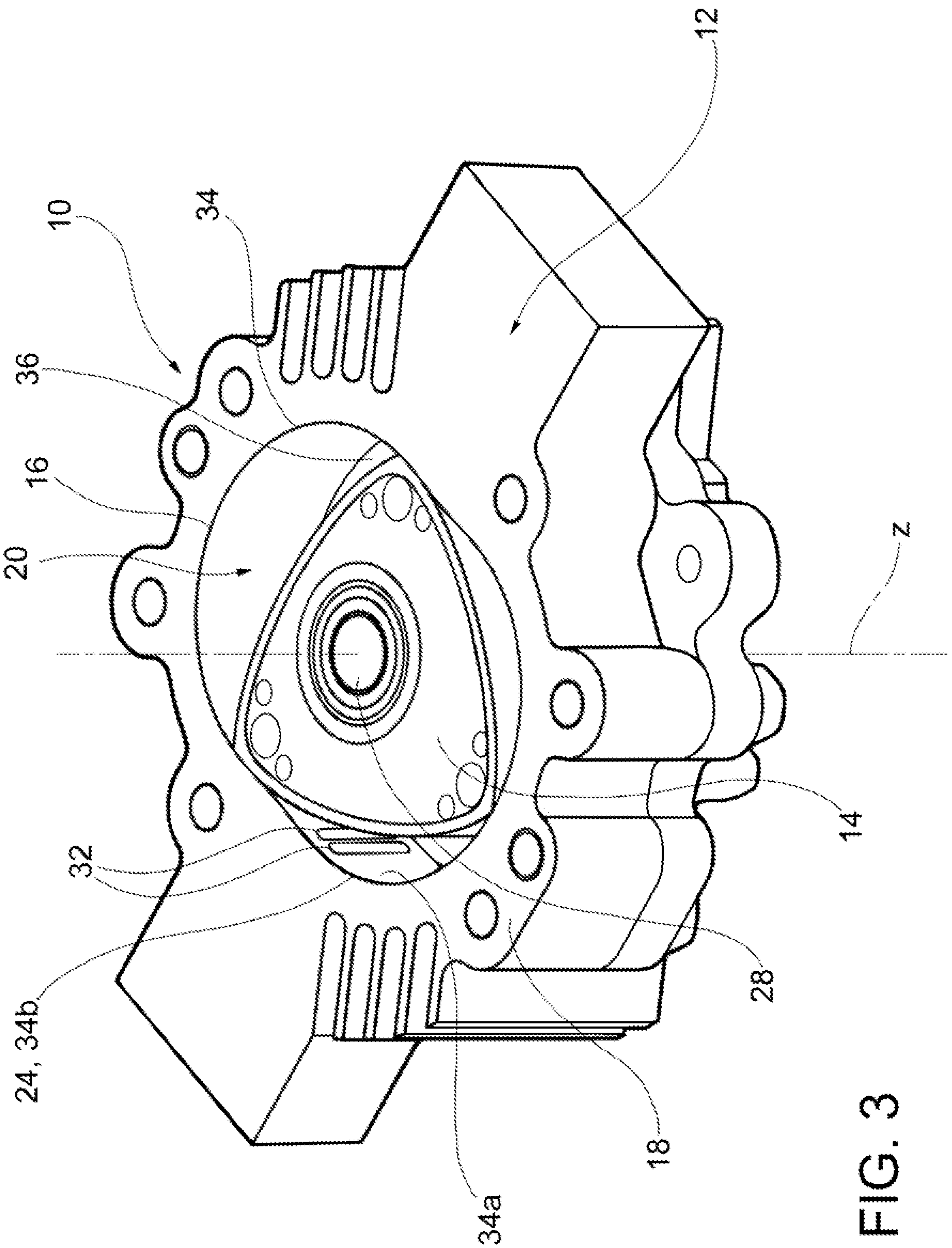
FIG. 3 is a perspective view in partial section of the non-lubricated compressor of FIG. 1, with the rotor element shown.

The rotor element 14 is arranged inside, or within, the rotor cavity 20, for compressing a gas therein upon rotation around an axis z, in a manner known per se. As shown in FIG. 3, the rotor element 14 may be mounted on a rotor shaft 28 rotating about the axis z, which may extend through the housing 18 on both or either side, and be drivingly connected for rotation thereto by means of appropriate meshing of gears.

In a most preferable embodiment, the compressor 10 may be a Wankel-type compressor. Therefore, in this embodiment, the rotor cavity 20 is made as a Wankel-type compression chamber, while the rotor element 14 is Wankel-type rotor. In a known manner, a Wankel-type rotor is similar in shape to a Reuleaux triangle, and is arranged for eccentric motion about the axis z. Therefore, the rotor element 14 may be arranged for eccentric rotary motion around the axis z, which is substantially orthogonal to the bottom wall 22 of the rotor cavity 20.

In a manner known per se, the compressor 10 is supplied with gas to be compressed and supplies itself compressed gas. In an embodiment, at least one inlet opening 30 and at least one outlet opening 32 are provided for, respectively, the supply of gas to be compressed and the exhaust of compressed gas. Preferably, the at least one inlet opening 30 and the at least one outlet opening 32 are both provided as through hole on the bottom wall 22 of the rotor cavity 20. As clear to the person skilled in the art, the at least one inlet opening 30 and the at least one outlet opening 32 are matched by respective through holes defined through the thickness of the sealing element 16 so that gas may flow inward and outward of the rotor cavity 20. However, the at least one inlet opening 30 and/or the at least one outlet opening 32 may also be positioned at different locations of the rotor cavity 20. For example, in the embodiment shown in the figures, a pair of inlet openings 30 are provided through the bottom wall 22 of the rotor cavity 20, and a pair of outlet openings 32 are provided through the lateral wall 26 of the rotor cavity 20.

The sealing element 16 is a self-supporting sealing element 16, and is arranged, or fitted, within, or inside, the rotor cavity 20 for providing a sufficiently tight sealing between the rotor element 14 and the inner surfaces of the rotor cavity 20. To this end, the sealing element 16 comprises a wall portion 34 that is arranged on an inner surface of the lateral wall 26 of the rotor cavity, preferably in direct contact with such an inner surface. 'Inner surface' hereby refers to a surface that faces inward the rotor cavity 20.

The wall portion 34 of the sealing element 16 has an inner surface 34*a* and an outer surface 34*b*, wherein the inner surface 34 faces inward the rotor cavity 20 and the outer surface 34*b* faces outward the rotor cavity, i.e. it is arranged opposed to the inner surface 34*a*, or on the opposed side of the wall portion 34. In a most preferable embodiment of the invention, the inner surface 34*b* has an epitrochoidal shape, or a hypotrochoid shape, in a cross-section on a plane that is parallel to the bottom wall 22 of the rotor cavity 20 or that is orthogonal to the axis z around which the rotor element 14 rotates. The outer surface 34*b* of the wall portion 34 of the sealing element 16 need not be parallel to inner surface 34*a*. Nevertheless, in a preferable embodiment, the outer surface 34*b* is fully, or entirely, in contact with the lateral wall 26 of the rotor cavity 20. In this case, the outer surface 34*b* of the wall portion 34 of the sealing element 16 may copy the shape of the lateral wall 26, i.e., for example, it may be of any shape, although in a preferable embodiment it has a stadium shape, or a discorectangular shape, or an obround shape, i.e. it comprises two flat wall portions, facing each other, joined by a pair of opposed semi-circular walls.

The sealing element 16 is shrink-fit inside the rotor cavity 20, so that the inner surface 34*a* of the wall portion 34 replaces the contact portion, i.e. the inner surface, or the surface of the lateral wall 26 of the rotor cavity 20 facing inward the rotor cavity 20, on which the rotor element 14 would otherwise run.

The sealing element 16 may further comprise a plate-like portion 36, which is arranged on an inner surface of the bottom wall 22 of the rotor cavity 20. The plate-like portion 36 may be connected with, or integral with (i.e., they are made in one piece), the rest of the sealing element 16, i.e. with the wall portion 34 of the sealing element 16. When the at least one inlet opening 30 and/or the at least one outlet opening 32 are provided on the bottom wall 22 of the rotor cavity 20, the plate-like portion 36 of the sealing element is also provided with respective through holes facing, respectively, the at least one inlet opening 30 and/or the at least one outlet opening 32 in order to allow gas to flow inward and outward the rotor cavity 20.

In a preferable embodiment, the sealing element 16 may also comprise a further plate-like portion 38, which is arranged on, or (at least partially) in contact with, an inner surface of the top wall 24 of the rotor cavity 20. Either alternatively to the further plate-like portion 38, or in combination with it, a single-layer or a multi-layer coating of abradable carbon material may also be applied to the inner surface of the top wall 24.

In a preferable embodiment, the plate-like portion 36 of the sealing element 16 and the wall portion 34 of the sealing element 16 are made in one piece, or integral with one another, while the further plate-like portion 38 is provided as a separate component to cover and enclose the rotor cavity 20. For example, the further plate-like portion 38 may be attached to a inward-facing side of a cover 40 of the housing 18 intended to close the rotor cavity 20.

In preferred embodiments, the sealing element 16 has a minimum thickness of at least 2 mm, preferably of at least 3 mm. This thickness is to be evaluated at the wall portion 34, and, when present, at the plate-like portion 36 and at the further plate-like portion 38.

The sealing element 16 is made of abradable carbon material, preferably it is entirely made of abradable carbon material. In a preferable embodiment, the sealing element 16 comprises a layered structure made of abradable carbon material. In a further preferable embodiment, the sealing element is made of a carbon matrix as already described above. Finally, the sealing element 16 preferably has a C2 Shore hardness comprised between about 60 and about 70, and more preferably of about 65.

As anticipated, the second aspect of the invention concerns a method for assembling the non-lubricated compressor 10 according to first aspect of the invention. The method comprises at least the steps of:

a) manufacturing a semi-finished sealing element 16;
b) heating the housing 18 of the stator 12;
c) fitting the semi-finished sealing element 16 inside the housing 18;
d) mounting the rotor element 14 inside the semi-finished sealing element 16;
e) running the rotor element 14 so that the semi-finished sealing element 16 is further machined by the rotor element 14.

In particular, step a) of manufacturing the semi-finished sealing element 16 is performed by machining a block of abradable carbon material so that an outer shape of the block copies the inner shape of the rotor cavity 20. In particular, the block is machined so that it has an upwardly open, inner cavity, which is delimited by a bottom wall and by a lateral wall that has a constant thickness.

The housing 18 of the stator 12 is heated up to a temperature of at least 350° C. As it is clear to the person skilled in the art, the minimum temperature to which the housing 18 needs to be heated, and the maximum temperature to which it can be heated, both depend on the thermal expansion coefficient of the material of the housing 18, on the size of the housing 18, and on the size of the semi-finished sealing element 16 which needs to be shrink-fit inside the housing 18. Most preferably, the housing 18 is heated up to a temperature comprised between 150° C. and 450° C.

While the housing 18 is at a temperature of at least 350° C., the semi-finished sealing element 16 is fitted inside the rotor cavity 20 of the housing 18. In fact, thanks to the high temperature of the housing 18, the size of the rotor cavity 20 will have expanded because of thermal expansion, and the semi-finished sealing element 16 may easily fit inside the rotor cavity 20. Once the housing 18 cools down back to room temperature, the size of the rotor cavity 20 returns back to a smaller value. Therefore, the semi-finished sealing element 16 is well-positioned and shrink-fit inside the rotor cavity 20, with the wall portion 34 pushing on the lateral wall 26 of the rotor cavity 20.

The step c) of fitting the semi-finished sealing element 16 inside the rotor cavity 20 may further comprise, in a preferable embodiment of the method of the invention, also the step of applying an adhesive layer, or a layer of glue, or a layer of a thermal paste material, between the semi-finished sealing element 16 and the rotor cavity 20, in particular between the lateral wall of the semi-finished sealing element 16 and the lateral wall 26 of the rotor cavity 20.

In an embodiment of the method of the invention, the semi-finished sealing element 16 may further be machined before step c) is carried out, i.e. before the semi-finished sealing element 16 is fitted inside the rotor cavity 20, for example in order to obtain a certain value of surface roughness.

In another embodiment of the method of the invention, the bottom wall of the semi-finished element 16 is machined until it has a constant thickness, or at least it has a surface facing inward the inner cavity of the semi-finished sealing element 16 that is essentially flat.

The rotor element 14 is mounted inside the inner cavity of the semi-finished sealing element 16, and is therefore run so that the inner cavity of the semi-finished sealing element 16 is further machined by the rotor element 14 upon rotation of the latter.

In a preferable embodiment, the rotor element 14 is a Wankel-type rotor arranged for eccentric motion, so that, when step e) is carried out, the rotor element 14 abrades the inner cavity of the semi-finished sealing element 16 and machines an inner surface 34*a* of the sealing element 16 that has an epitrochoidal, or hypotrochoid, shape, when cut in a cross-section parallel to the bottom wall 22 of the rotor cavity 20 or that is essentially orthogonal to the axis z.

According to a preferable embodiment of the method of the invention, the method may further comprise the step of machining at least one inlet opening 30 through the wall portion 34 of the sealing element 16 and through the lateral wall 26 of the rotor cavity 20 for the supply of gas to be compressed. Even more preferably the at least one opening 30 through the wall portion 34 of the sealing element 16 and the one through the lateral wall 26 of the rotor cavity 20 are machined at the same time by means of a single drilling step, for example by laser drilling, in a known manner, after, or right after, step c) has been carried out.

In a similar manner, according to a preferable embodiment of the method of the invention, the method may further comprise the step of machining at least one outlet opening 32 through the wall portion 34 of the sealing element 16 and through the lateral wall 26 of the rotor cavity 20 for the exhaust of compressed gas. Even more preferably the at least one outlet 32 through the wall portion 34 of the sealing element 16 and the one through the lateral wall 26 of the rotor cavity 20 are machined at the same time by means of a single drilling step, for example by laser drilling, in a known manner, after, or right after, step c) has been carried out.

As it is clear from the description above, the non-lubricated compressor according to the invention has several advantages.

Providing the abradable carbon material as a self-supporting sealing element, rather than applying one or more layers of abradable coating to the interior wall of the housing, simplifies the production and/or assembly of the housing, saves time and money, and provides an tighter seal in a non-lubricated compressor.

Furthermore, due to the self-supporting nature of the sealing element (which does not require direct application of an abradable coating to the relevant part of the housing), materials with higher thermal resistance and/or better corrosion resistance can be used for the abradable coating, thus obtaining a seal that is more resistant to high operating temperatures and/or corrosion, which can extend the life of the non-lubricated system. More specifically, the self-supporting element provides corrosion protection for the part of the housing covered by it, which, given the state-of-the-art, provides better protection against corrosion than a coating. The higher thermal resistance that can be achieved ensures applicability at higher temperatures. Higher temperatures in such systems are mainly the result of higher inlet temperatures and/or higher pressure ratios. Consequently, a higher thermal resistance allows for an expansion of the operating range. Within the thermal capabilities of the material, however, the mechanical robustness still determines the service life. The higher thermal resistance is achieved by using carbon material or carbon-based materials as described herein, instead of state-of-the-art organic coatings. Furthermore, the possible application of a layer of glue and/or of thermal paste between the sealing element and the rotor cavity may facilitate heat transfer and thus further enhance the thermal resistance of the compressor as a whole.

Of course, without prejudice to the principle of the invention, the embodiments and the details of construction may be widely varied with respect to that which has been described and illustrated purely by way of non-limiting example, without thereby departing from the scope of the invention defined by the appended claims.

The invention claimed is:

1. A non-lubricated compressor (10) for compressing a gas, comprising:

a stationary stator (12) with a housing (18) comprising a rotor cavity (20) delimited by a bottom wall (22), a top wall (24), and a lateral wall (26) connecting said bottom wall (22) and said top wall (24), a rotor element (14) arranged for rotation about an axis (z) within the rotor cavity (20) for compressing a gas therein, a self-supporting sealing element (16) arranged within the rotor cavity (20), the compressor (10) being characterized in that the sealing element (16) is made of an abradable carbon material, and in that the sealing element (16) comprises a wall portion (34) arranged on an inner surface of the lateral wall (26) of the rotor cavity (20), wherein the sealing element (16) has a C2 Shore hardness comprised between 60 and 70.

2. The compressor according to claim 1, wherein the sealing element (16) further comprises a plate-like portion (36), connected with or integral with the wall portion (34) of the sealing element (16), the plate-like portion (36) being arranged on an inner surface of the bottom wall (22) of the rotor cavity (20).

3. The compressor according to claim 1, wherein the wall portion (34) of the sealing element (16) has an inner surface (34*a*) facing inward the rotor cavity (20) and an outer surface (34*b*) on the opposed side, said inner surface (34*a*) having an epitrochoidal shape in a cross-section on a plane that is parallel to the bottom wall (22) of the rotor cavity (20) or in a plane that is orthogonal to the central axis (z).

4. The compressor according to claim 3, wherein the outer surface (34*b*) of the wall portion (34) of the sealing element (16) is entirely in contact with the lateral wall (26) of the rotor cavity (20).

5. The compressor according to claim 1, wherein the sealing element (16) comprises a further plate-like portion (38) arranged on an inner surface of the top wall (24) of the rotor cavity (20).

6. The compressor according to claim 5, wherein the plate-like portion (36) and the wall portion (34) of the sealing element (16) are made in one piece, and wherein the further plate-like portion (38) is provided as a separate cover component.

7. The compressor according to claim 1, wherein the sealing element (16) has a minimum thickness of at least 2 mm.

8. The compressor according to claim 1, wherein the sealing element (16) comprises a layered structure.

9. The compressor according to claim 1, wherein the sealing element (16) is made of a carbon matrix.

10. The compressor according to claim 1, wherein the rotor cavity (20) is a Wankel compression chamber and the rotor element (14) is a Wankel rotor arranged for eccentric motion about the axis (z) substantially orthogonal to said bottom wall (22) of the rotor cavity (20).

11. The compressor according to claim 1, wherein at least one inlet opening (30) and at least one outlet opening (32) are provided on the lateral and/or bottom wall (22) of the rotor cavity (20) for, respectively, the supply and the exhaust of the gas.

12. A method for assembling a non-lubricated compressor (10) according to claim 1, comprising the steps of:

a) manufacturing a semi-finished sealing element (16) by machining a block of abradable carbon material so that an outer shape of said block copies an inner shape of said rotor cavity (20), and so that the block has an open, inner cavity delimited by a bottom wall and by a lateral wall that has a constant thickness;

b) heating the housing (18) of the stator (12) to a temperature of at least 350° C.;

c) fitting the semi-finished sealing element (16) inside the rotor cavity (20) of the housing (18) as long as the housing (18) is at a temperature of at least 350° C.;

d) mounting the rotor element (14) inside the inner cavity of the semi-finished sealing element (16);

e) running the rotor element (14) so that the inner cavity of the semi-finished sealing element (16) is further machined by the rotor element (14).

13. The method according to claim 12, wherein the rotor element (14) is a Wankel rotor arranged for eccentric motion about the axis (z), and wherein the step e) is performed to obtain an inner surface (34*a*) of the sealing element (16) having an epitrochoidal shape in a cross-section on a plane that is parallel to the bottom wall (22) of the rotor cavity (20) or on a plane that is orthogonal to the axis (z).

14. The method according to claim 12, further comprising the step of:

f) after step c) and before step d), machining the bottom wall of the semi-finished sealing element (16) until it has a constant thickness.

15. The method according to claim 12, further comprising the steps of:

g1) after step c), machining, by means of a single drilling step, at least one inlet opening (30) through the wall portion (34) of the sealing element (16) and through the lateral wall (26) of the rotor cavity (20) for the supply of gas to be compressed; and g2) after step c), machining, by means of a single drilling step, at least one outlet opening (32) through the wall portion (34) of the sealing element (16) and through the lateral wall (26) of the rotor cavity (20) for the exhaust of the compressed gas.

16. The method according to claim 12, wherein step c) further comprises applying an adhesive layer between the semi-finished sealing element (16) and the rotor cavity (20).

17. A method for assembling a non-lubricated compressor (10) comprising:

a stator (12) with a housing (18) comprising a rotor cavity (20) delimited by a bottom wall (22), a top wall (24), and a lateral wall (26) connecting said bottom wall (22) and said top wall (24), a rotor element (14) arranged for rotation about an axis (z) within the rotor cavity (20) for compressing a gas therein, a sealing element (16) arranged within the rotor cavity (20), the compressor (10) being characterized in that the sealing element (16) is made of an abradable carbon material, and in that the sealing element (16) comprises a wall portion (34) arranged on an inner surface of the lateral wall (26) of the rotor cavity (20), the method comprising the steps of:

a) manufacturing the semi-finished sealing element (16) by machining a block of abradable carbon material so that an outer shape of said block copies an inner shape of said rotor cavity (20), and so that the block has an open, inner cavity delimited by a bottom wall and by a lateral wall that has a constant thickness;

b) heating the housing (18) of the stator (12) to a temperature of at least 350° C.;

c) fitting the semi-finished sealing element (16) inside the rotor cavity (20) of the housing (18) as long as the housing (18) is at a temperature of at least 350° C.;

d) mounting the rotor element (14) inside the inner cavity of the semi-finished sealing element (16);

e) running the rotor element (14) so that the inner cavity of the semi-finished sealing element (16) is further machined by the rotor element (14).

* * * * *